US012352186B2

(12) United States Patent
Houle et al.

(10) Patent No.: US 12,352,186 B2
(45) Date of Patent: Jul. 8, 2025

(54) STATOR VANE FOR A GAS TURBINE ENGINE

(71) Applicant: Pratt & Whitney Canada Corp., Longueuil (CA)

(72) Inventors: Nicola Houle, Montreal (CA); Domenico Di Florio, Saint Lazare (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/954,021

(22) Filed: Sep. 27, 2022

(65) Prior Publication Data

US 2024/0102395 A1 Mar. 28, 2024

(51) Int. Cl.

*F01D 9/04* (2006.01)
*F01D 5/16* (2006.01)
*F01D 5/18* (2006.01)
*F01D 5/26* (2006.01)
*F04D 29/66* (2006.01)

(52) U.S. Cl.

CPC ............... *F01D 9/041* (2013.01); *F01D 5/16* (2013.01); *F01D 5/18* (2013.01); *F01D 5/26* (2013.01); *F04D 29/66* (2013.01); *F04D 29/668* (2013.01); *F05D 2240/123* (2013.01); *F05D 2240/124* (2013.01); *F05D 2240/125* (2013.01); *F05D 2250/141* (2013.01)

(58) Field of Classification Search

CPC ......... F05D 2240/123; F05D 2240/124; F05D 2240/125; F05D 2250/141; F01D 9/041; F01D 5/16; F01D 5/18; F01D 5/26; F04D 29/66; F04D 29/668

See application file for complete search history.

(56) References Cited

U.S. PATENT DOCUMENTS 8,608,448 B2 12/2013 Harvey
10,107,115 B2 10/2018 Alvanos
10,385,865 B2 8/2019 Raghavan
2008/0219835 A1* 9/2008 Freling ................ F04D 29/083 415/173.4

(Continued)

FOREIGN PATENT DOCUMENTS

WO 2018219611 A1 12/2018

OTHER PUBLICATIONS

EP search report for EP23200234.5 dated Feb. 13, 2024.

*Primary Examiner* — Brian Christopher Delrue
(74) *Attorney, Agent, or Firm* — Getz Balich LLC

(57) ABSTRACT

A stator vane for a gas turbine stator vane stage is provided that includes an airfoil having leading and trailing edges, a vane tip, suction and pressure side surfaces, and at least one aero passage. The leading and trailing edges are chordwise spaced apart. The vane tip is spanwise spaced apart from a radial base end. The suction side surface extends chordwise between the leading and trailing edges, and extends spanwise between the radial base end and the vane tip. The pressure side surface extends chordwise between the leading and trailing edges, and extends spanwise between the radial base end and the vane tip. The at least one aero passage extends through the airfoil between the suction and pressure side surfaces, and is disposed proximate and spanwise separated from the vane tip. The stator vane is configured to be cantilevered with the vane tip being unsupported.

8 Claims, 7 Drawing Sheets

(56) References Cited

U.S. PATENT DOCUMENTS

| | | | | |
|---|---|---|---|---|
| 2010/0266385 | A1 | 10/2010 | Praisner | |
| 2013/0089421 | A1 | 4/2013 | Nussbaum | |
| 2016/0245091 | A1* | 8/2016 | Kupratis | F01D 5/147 |
| 2017/0218774 | A1* | 8/2017 | Bloxham | F04D 29/542 |
| 2021/0039767 | A1* | 2/2021 | Paruchuri | B64C 3/14 |

* cited by examiner

STATOR VANE FOR A GAS TURBINE ENGINE

BACKGROUND OF THE INVENTION

1. Technical Field

The present disclosure relates gas turbine engines in general and to stator vanes in particular.

2. Background Information

A gas turbine engine of a type preferably provided for use in subsonic flight generally includes in serial flow communication a fan through which ambient air is propelled, a compressor for pressurizing the air, a combustor in which the compressed air is mixed with fuel and ignited for generating an annular stream of hot combustion gases, and a turbine section for extracting energy from the combustion gases. In many instances, the compressor section and the turbine section each include a plurality of rotor stages and a plurality of stator vane stages. The rotor stages within the compressor section rotate about a rotational axis. Likewise, the rotor stages within the turbine section rotate about a rotational axis. Each rotor stage typically includes a hub with a plurality of rotor blades extending radially outward from the hub. A compressor section may include one or more stator vane stages, each including a plurality of stator vanes disposed around the circumference of the stage. In an axial flow gas turbine engine, the stator vanes extend radially between inner and outer gas path structures that define the gas flow path there between. The stator vanes are typically configured to direct airflow into a rotor stage or to direct airflow exiting a rotor stage. Some stator vane stages are configured so that the stator vanes are attached at an outer radial end and have an unsecured blade tip disposed proximate the inner gas path structure (i.e., cantilevered stator vanes).

The airflow flow entering and exiting a stator vane stage is typically a three-dimensional flow that may vary circumferentially and radially. In some applications, airflow acting on a stator vane can induce vibrational mode responses that may lead to a resonant condition in a stator vane, and/or to high cycle fatigue (HCF). This is particularly true for cantilevered stator vanes. What is needed is a stator vane configured to operate in a three-dimensional flow field, one that has an improved ability to avoid undesirable vibrational responses, and one that has an improved ability to withstand HCF.

SUMMARY

According to an aspect of the present disclosure a stator vane for a gas turbine stator vane stage is provided that includes an airfoil having a leading edge, a trailing edge, a vane tip, a suction side surface, a pressure side surface, and at least one aero passage. The leading edge is chordwise spaced apart from the trailing edge. The vane tip is spanwise spaced apart from a radial base end. The suction side surface extends chordwise between the leading edge and the trailing edge, and extends spanwise between the radial base end and the vane tip. The pressure side surface extends chordwise between the leading edge and the trailing edge, and extends spanwise between the radial base end and the vane tip. The suction and pressure side surfaces are disposed on opposite sides of the airfoil. The at least one aero passage extends through the airfoil between the suction side surface and the pressure side surface, and is disposed proximate and spanwise separated from the vane tip. The stator vane is configured so when disposed within the stator vane stage, the airfoil is cantilevered with the vane tip being unsupported.

In any of the aspects or embodiments described above and herein, the at least one aero passage may be a plurality of aero passages, and each of the plurality of aero passages extends through the airfoil between the suction side and pressure side surfaces along a respective aero passage axis, and disposed proximate the vane tip.

In any of the aspects or embodiments described above and herein, at least one respective aero passage axis may be substantially perpendicular to the suction side surface and to the pressure side surface.

In any of the aspects or embodiments described above and herein, the suction side surface has a total surface area (SS surface area) defined by the leading edge, the trailing edge, the radial base end, and the vane tip, and the pressure side surface has a total surface area (PS surface area) defined by the leading edge, the trailing edge, the radial base end, and the vane tip, and the plurality of aero passages may be disposed within the airfoil in a region of the airfoil contiguous with the vane tip that is about twenty percent of the SS surface area or is about twenty percent of the PS surface area.

In any of the aspects or embodiments described above and herein, each of the plurality of aero passages has a flow area and the sum of the respective aero passage flow areas is a collective flow area, and the collective flow area may be in the range of about twenty-five to about seventy-five percent of the about twenty percent of the SS surface area or the about twenty percent of the PS surface area.

In any of the aspects or embodiments described above and herein, the airfoil has a spanwise extending length and a chordwise extending width, and each of the plurality of aero passages may have a tip-most edge, and the tip most edge of each aero passage may be separated from the vane tip by a distance in the range of about five to about ten percent of the spanwise length of the airfoil at the respective aero passage.

In any of the aspects or embodiments described above and herein, at least one aero passage may have a circular shape.

In any of the aspects or embodiments described above and herein, the airfoil may further include a vane tip surface disposed at the vane tip, the vane tip surface extending between the suction side and pressure side surfaces. The vane tip surface may include a first vane tip surface portion and a second vane tip surface portion. The first vane tip surface portion extends between the trailing edge and an interface, and the second vane tip surface portion extends between the leading edge and the interface, and the second vane tip surface portion may be disposed at a non-zero angle relative to the first vane tip surface portion.

In any of the aspects or embodiments described above and herein, at least one respective aero passage axis may be disposed at non-perpendicular angle relative to a line substantially perpendicular to the suction side and pressure side surfaces.

In any of the aspects or embodiments described above and herein, the suction side surface has a total surface area (SS surface area) defined by the leading edge, the trailing edge, the radial base end, and the vane tip, and the pressure side surface has a total surface area (PS surface area) defined by the leading edge, the trailing edge, the radial base end, and the vane tip, and the plurality of aero passages may be disposed within the airfoil in a region of the airfoil contiguous with the vane tip that is about twenty percent of the SS surface area or is about twenty percent of the PS surface area.

In any of the aspects or embodiments described above and herein, each of the plurality of aero passages has a flow area and the sum of the respective aero passage flow areas is a collective flow area, and the collective flow area may be in the range of about twenty-five to about seventy-five percent of the about twenty percent of the SS surface area or the about twenty percent of the PS surface area.

In any of the aspects or embodiments described above and herein, the airfoil has a spanwise extending length and a chordwise extending width. Each of the plurality of aero passages has a tip-most edge, and the tip most edge of each aero passage may be separated from the vane tip by a distance in a range of about five to about ten percent of the spanwise length of the airfoil at the respective aero passage.

In any of the aspects or embodiments described above and herein, the at least one aero passage may be a single aero passage having a slot-like configuration with a chordwise extending length and a spanwise extending width. The slot length may be greater than the slot width, wherein the single aero passage extends through the airfoil between the suction side surface and the pressure side surface along an aero passage axis.

In any of the aspects or embodiments described above and herein, the aero passage axis may be substantially perpendicular to the suction side and pressure side surfaces.

In any of the aspects or embodiments described above and herein, the suction side surface has a total surface area (SS surface area) defined by the leading edge, the trailing edge, the radial base end, and the vane tip, and the pressure side surface has a total surface area (PS surface area) defined by the leading edge, the trailing edge, the radial base end, and the vane tip. The single aero passage may be disposed within the airfoil in a region of the airfoil contiguous with the vane tip that is about twenty percent of the SS surface area or is about twenty percent of the PS surface area.

In any of the aspects or embodiments described above and herein, the single aero passage may have a flow area in the range of about twenty-five to about seventy-five percent of the about twenty percent of the SS surface area or the about twenty percent of the PS surface area.

In any of the aspects or embodiments described above and herein, the airfoil has a spanwise extending length and a chordwise extending width. The single aero passage has a tip-most edge, and the tip most edge of the single aero passage may be separated from the vane tip by a distance in a range of about five to about ten percent of the spanwise length of the airfoil.

In any of the aspects or embodiments described above and herein, the airfoil may further include a vane tip surface disposed at the vane tip that extends between the suction side and pressure side surfaces. The vane tip surface may include a first vane tip surface portion and a second vane tip surface portion. The first vane tip surface portion may extend between the trailing edge and an interface, and the second vane tip surface portion may extend between the leading edge and the interface. The second vane tip surface portion may be disposed at a non-zero angle relative to the first vane tip surface portion.

According to another aspect of the present disclosure, a stator vane for a gas turbine stator vane stage is provided. The stator vane includes an airfoil having a leading edge chordwise spaced apart from a trailing edge, a vane tip spanwise spaced apart from a radial base end, a suction side surface, a pressure side surface, and a vane tip surface. The suction side surface extends chordwise between the leading edge and the trailing edge, and extends spanwise between the radial base end and the vane tip. The pressure side surface extends chordwise between the leading edge and the trailing edge, and extends spanwise between the radial base end and the vane tip. The suction side and pressure side surfaces are disposed on opposite sides of the airfoil. The vane tip surface extends between the suction side and pressure side surfaces. The vane tip surface includes a first vane tip surface portion and a second vane tip surface portion. The first vane tip surface portion extends between the trailing edge and an interface, and the second vane tip surface portion extends between the leading edge and the interface. The second vane tip surface portion is disposed at a non-zero angle relative to the first vane tip surface portion. The stator vane is configured so when disposed within the stator vane stage, the airfoil is cantilevered with the vane tip being unsupported.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
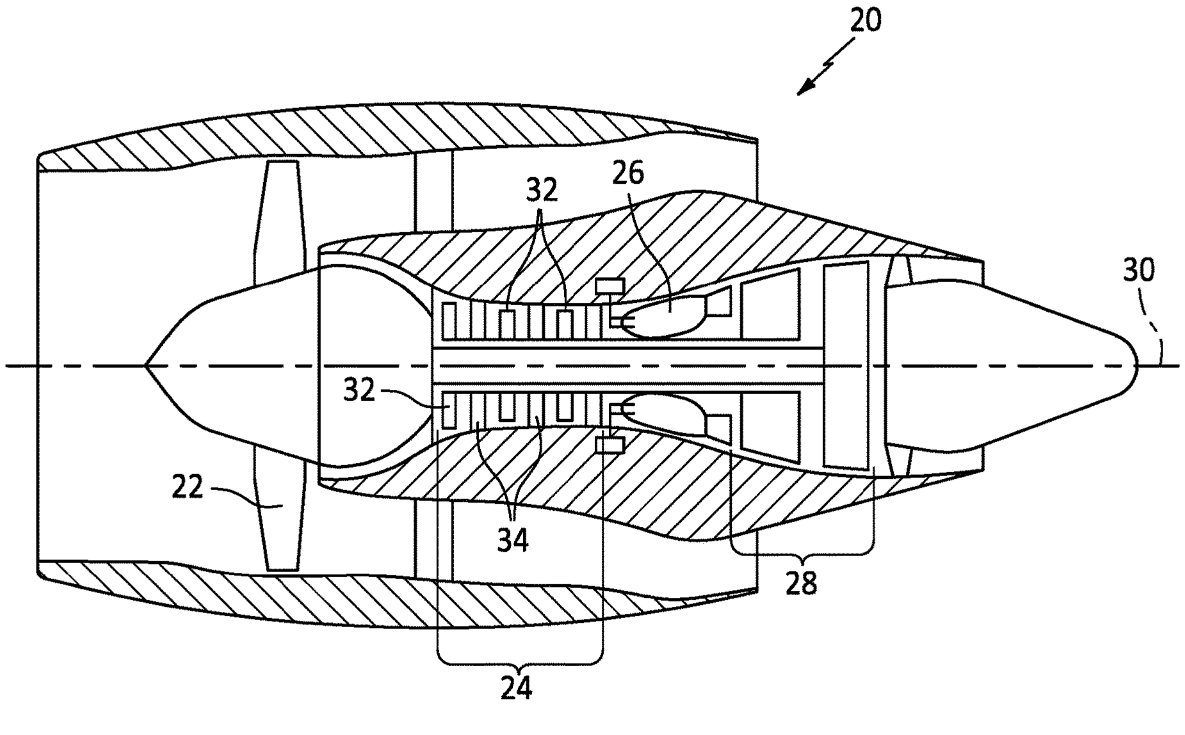
FIG. 1 is a diagrammatic view of a gas turbine engine.

FIG. 1 illustrates a gas turbine engine 20 of a type preferably provided for use in subsonic flight, generally comprising in serial flow communication a fan 22 through which ambient air is propelled, a compressor section 24 for pressurizing the air, a combustor 26 in which the compressed air is mixed with fuel and ignited for generating an annular stream of hot combustion gases, and a turbine section 28 for extracting energy from the combustion gases. The gas turbine engine 20 example shown in FIG. 1 is a two-spool turbofan rotational about a rotational axis 30. The present disclosure is not limited to use with two spool turbofan engines. In addition, the gas turbine engine example shown in FIG. 1 is shown as having spools rotating about the same rotational axis. The present disclosure is not limited to use with gas turbine engines having a plurality of spools rotating about the same rotational axis. It should be understood that the concepts described herein may be applied to a variety of gas turbine engine architectures, including gas turbine engines having geared architectures.

The compressor section 24 may include a single compressor section or more than one compressor section; e.g., a low pressure compressor and a high pressure compressor. To facilitate the description herein, the compressor section will be described below in terms of a single compressor section, but the present disclosure is not limited thereto. The compressor section 24 may include one or more axial compressor rotor stages 32 and one or more compressor stator stages 34 that may be located immediately downstream of a compressor rotor stage 32. It should be noted that the terms "upstream" and "downstream" used herein refer to the direction of an air/gas flow passing through an annular gas path of the gas turbine engine 20. It should also be noted that the terms "radial" and "circumferential" are used herein with respect to the longitudinal rotational axis 30 of the gas turbine engine 20. Each compressor rotor stage 32 includes a hub with a plurality of rotor blades extending radially outward from the hub and distributed around the circumference of the compressor rotor stage, and each compressor rotor stage is configured to rotate about the rotational axis 30 of the gas turbine engine 20 to perform work on the air.

Each compressor stator stage 34 is a non-rotating component that may guide the flow of pressurized air towards or away from a compressor rotor stage 32. Each compressor stator stage 34 has a plurality of stator vanes 36 (e.g., see FIG. 2). Each stator vane 36 is configured to diffuse the airflow impinging thereon and to redirect the airflow; e.g., toward the next downstream compressor rotor stage 32. Typically, each stator vane 36 has an airfoil 37 shaped body having a suction side surface 38, a pressure side surface 40, a leading edge 42, a trailing edge 44, a radial base end 46, a vane tip 48, and vane tip surface 50 disposed at the vane tip 48. Typically, each stator vane 36 is solid; i.e., continuous material between the suction side surface 38 and the pressure side surface 40, with no internal voids other than as described herein. The chord length of the airfoil 37 is defined between the leading edge and the trailing edge 44. The suction side surface 38 and the pressure side surface 40 extend chordwise between the leading edge and the trailing edge 44, and radially (also referred to as "spanwise") between the radial base end 46 and the vane tip 48. In those embodiments wherein a compressor stator vane 36 is configured as a cantilevered structure, the vane tip 48 is disposed in close proximity to an inner gas path structure 52 (e.g., see FIG. 3) and the radial base end 46 is disposed in close proximity to an outer gas path structure 54. In some embodiments, a stator vane 36 may include a platform disposed at the radial base end 46 of the vane 37 that forms a portion of the outer gas path structure 54. In some embodiments, a stator vane stage 34 may include an annular shroud structure that defines the outer gas path structure 54. The present disclosure is not limited to any particular outer gas path structure 54. The inner gas path structure 52 and the outer gas path structure 54 define an annular gas path through the stator vane stage 34. The stator vanes 36 in the stator vane stage 34 are typically spaced equidistantly from one another around the circumference of the stator vane stage 34. FIG. 1 illustrates stator vane stages 34, each having a plurality of stator vanes 36 that are positionally fixed. Other stator vane stage 34 embodiments may include stator vanes 36 that are pivotally mounted to permit the vanes 36 to be rotated relative to the incidence angle of airflow entering the stator vane stage 34.

The airflow incident to a compressor stator vane 36 is very often chaotic. Specific airflow characteristics may vary as a function of operating conditions such as rotor stage revolutions (rpms), aircraft altitude, etc. The chaotic airflow acting on individual stator vanes 36 may also vary periodically, vary as a function of radial position, or the like, and combinations thereof. This can be particularly problematic for a compressor stage having stator vanes 36 that are cantilevered with a vane tip 48 disposed in close proximity to the inner gas path structure 52. Periodic forces acting on a stator vane 36 can subject the stator vane 36 to different fundamental vibrational modes, including bending modes and torsional modes. Under certain operating conditions, it is possible that periodic forces acting on a stator vane 36 may induce vibrational modes which in turn may give rise to a resonant response in one or more regions of the stator vane 36. These fundamental vibrational modes (including resonance), in turn can produce stresses that lead to undesirable high cycle fatigue (HCF).

Stator vanes 36 according to the present disclosure are configured to mitigate fundamental vibrational modes, and in particular are configured to mitigate fundamental vibrational modes in the regions of a cantilevered stator vane 36 proximate the vane tip 48.

Figure 2:
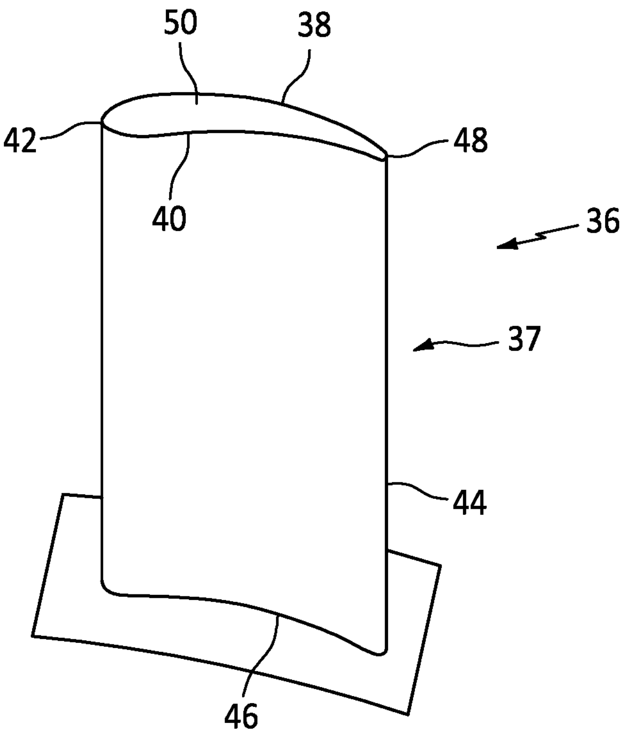
FIG. 2 is a diagrammatic perspective view of a stator vane.
Figure 3:
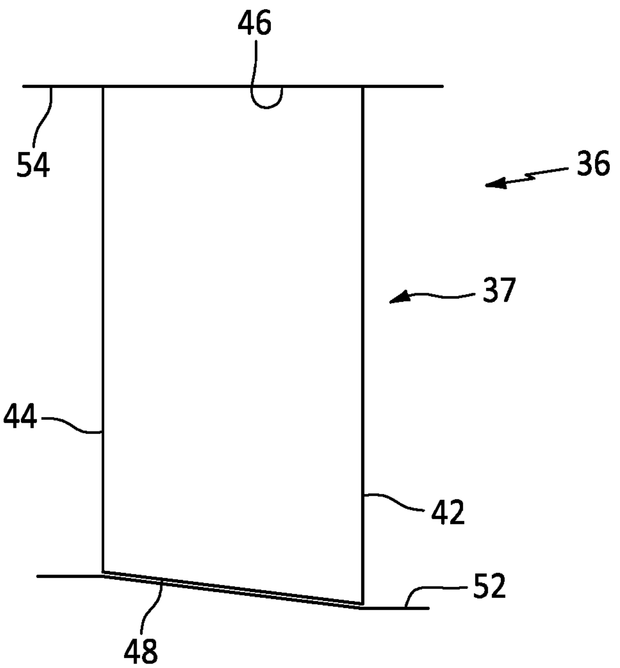
FIG. 3 is a diagrammatic planar view of a stator vane showing an outer gas path structure and an inner gas path structure.

FIG. 2 diagrammatically illustrates a stator vane 36 having a suction side surface 38, a pressure side surface 40, a leading edge 42, a trailing edge 44, a radial base end 46, a vane tip 48, and a vane tip surface 50. The suction side surface 38 and pressure side surface 40 extend chordwise between the leading edge 42 and the trailing edge 44, and spanwise between the radial base end 46 and the vane tip 48. The vane tip surface 50 extends between the leading edge 42 and the trailing edge 44, and the pressure side surface 40 and the suction side surface 38. In some embodiments (e.g., see FIG. 3), the vane tip surface 50 may be configured as a surface that extends along a continuous line; e.g., linearly along a straight line or a line having a substantially uniform curvature with no abrupt change.

In some embodiments, a stator vane 36 may be configured as a surface that does not extend along a continuous line. For example, a stator vane 36 may include a vane tip surface 50 that includes a first portion 50A and a second portion 50B as diagrammatically shown in FIGS. 4, 4A, and 5. The first and second vane tip surface portions 50A, 50B extend between the pressure side surface 40 and the suction side surface 38.

Figure 4:
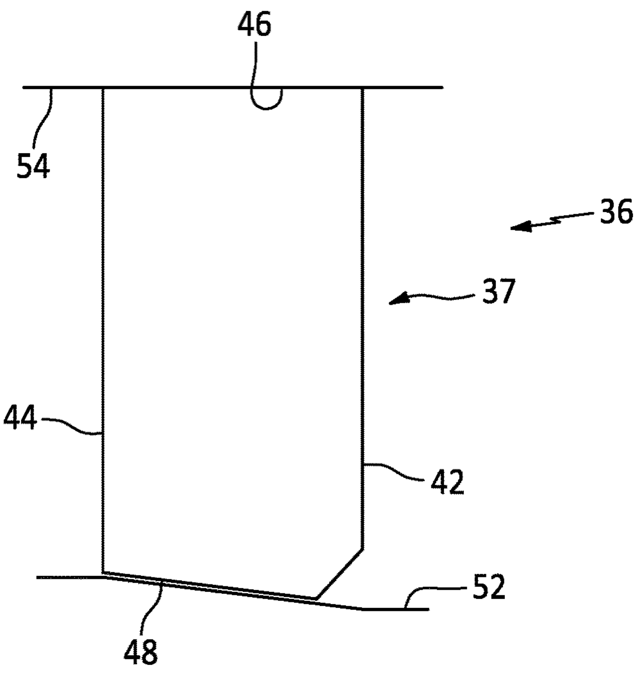
FIG. 4 is a diagrammatic planar view of a stator vane showing an outer gas path structure and an inner gas path structure, with the stator vane airfoil having a leading edge cutback.
Figure 4A:
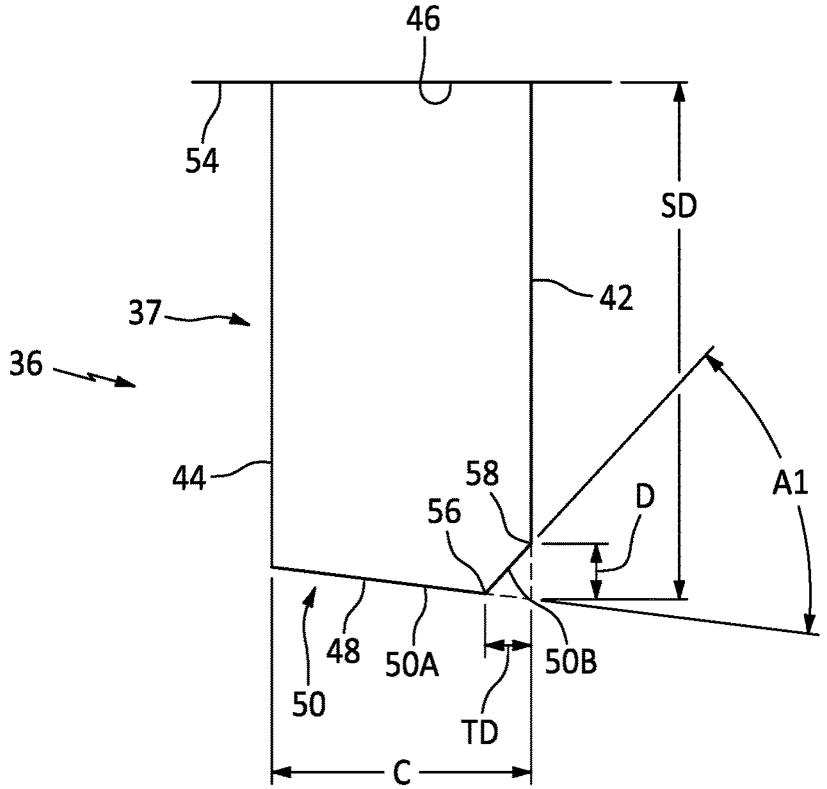
FIG. 4A is a stator vane like that shown in FIG. 4, providing positional information regarding the leading edge cutback.

In the stator vane 36 embodiment shown in FIGS. 4 and 4A, the first vane tip surface portion 50A extends between the trailing edge 44 to an interface 56 with the second vane tip surface portion 50B, and the second vane tip surface portion 50B extends between the leading edge 42 to the interface 56 with the first vane tip surface portion 50A. At the interface 56, the linearity or curvature of the first vane tip surface portion 50A changes to that of the second vane tip surface portion 50B and vice versa. In these embodiments, the second vane tip surface portion 50B may be disposed at an angle (A1) relative to the first vane tip surface portion 50A; e.g., giving the appearance that the corner of the vane airfoil 37 is removed—a "cutback". FIG. 4A uses dashed lines to illustrate how (if the vane tip surface 50 was continuous) the first vane tip surface portion 50A would otherwise extend to the leading edge 42, and thereby illustrate how the second vane tip surface portion 50B is disposed at an angle (A1) relative to the first vane tip surface portion. FIGS. 4 and 4A diagrammatically illustrate the first and second vane tip surface portions 50A, 50B as extending along respective straight lines. As stated above, however, a vane tip surface 50 may extend along a straight line or may extend along a curvilinear line. In some embodiments, the first vane tip surface portion 50A may extend along a straight line or a curvilinear line, and the second vane tip surface portion 50B may extend along a straight line or a curvilinear line, or any combination thereof.

The second vane tip surface portion 50B may terminate at a position 58 on the leading edge 42 that is a distance (D) of up to about ten percent (10%) of the spanwise distance (SD) of the airfoil 37. In other words, if the vane tip surface 50 continued to the leading edge 42 (as shown in dashed lines in FIG. 4A), the distance (D) between intersection 58 of the second vane tip surface portion 50B and the leading edge 42 and the point where the vane tip surface 50 would have otherwise intersected the leading edge 42 (if continuous as shown in dashed lines in FIG. 4A) is up to about ten percent (10%) of the spanwise distance (SD) of the leading edge 42 from the radial base end 46 to where it would intersect with the vane tip surface 50 if the vane tip surface 50 was continuous. The interface 56 between the first and second vane tip surface portions 50A, 50B may be disposed at a position on the vane tip surface 50 that is a distance (TD) of up to about ten percent (10%) of the chord (C) of the airfoil 37 at the vane tip 48; i.e., where the vane tip surface 50 would have intersected the leading edge 42 if continuous (e.g., as shown in dashed lines in FIG. 4A).

Figure 5:
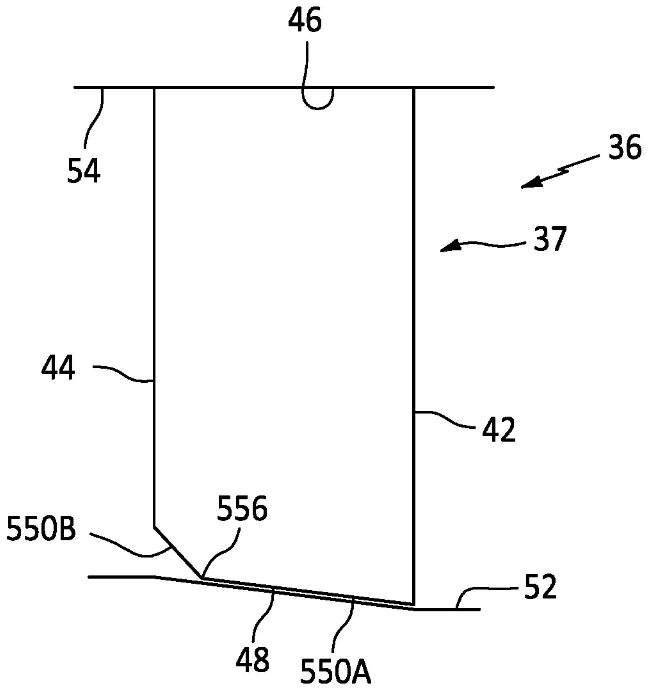
FIG. 5 is a diagrammatic planar view of a stator vane showing an outer gas path structure and an inner gas path structure, with the stator vane airfoil having a trailing edge cutback.

FIG. 5 illustrates an embodiment similar to that described above and shown in FIGS. 4 and 4A, with the removed corner of the vane airfoil 37 disposed at the trailing edge 44 in contrast to the stator vane 36 airfoil 37 shown in FIGS. 4 and 4A with the removed corner of the vane airfoil 37 disposed at the leading edge 42. In FIG. 5, the first vane tip surface portion 550A extends between the leading edge 42 to an interface 556 with the second vane tip surface portion 550B, and the second vane tip surface portion 550B extends between the trailing edge 44 to the interface 556 with the first vane tip surface portion 550A.

Figure 6:
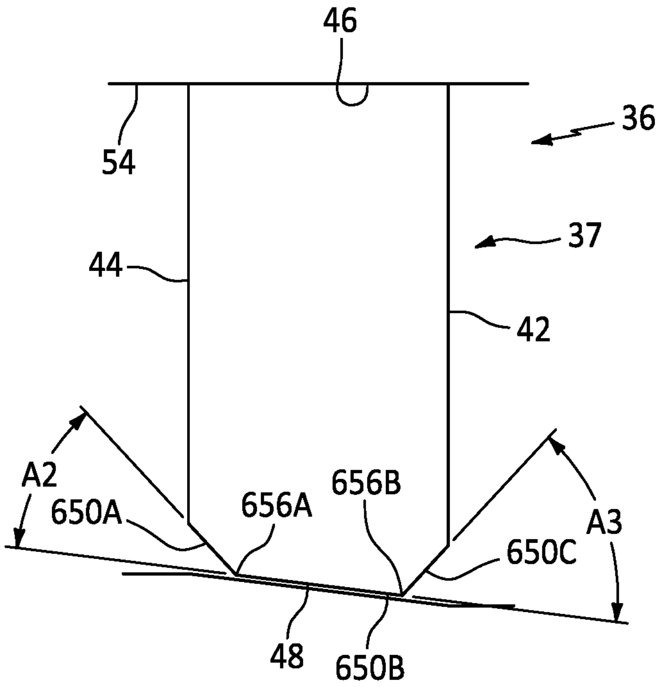
FIG. 6 is a diagrammatic planar view of a stator vane showing an outer gas path structure and an inner gas path structure, with the stator vane airfoil having a leading edge cutback and a trailing edge cutback.
Figure 6A:
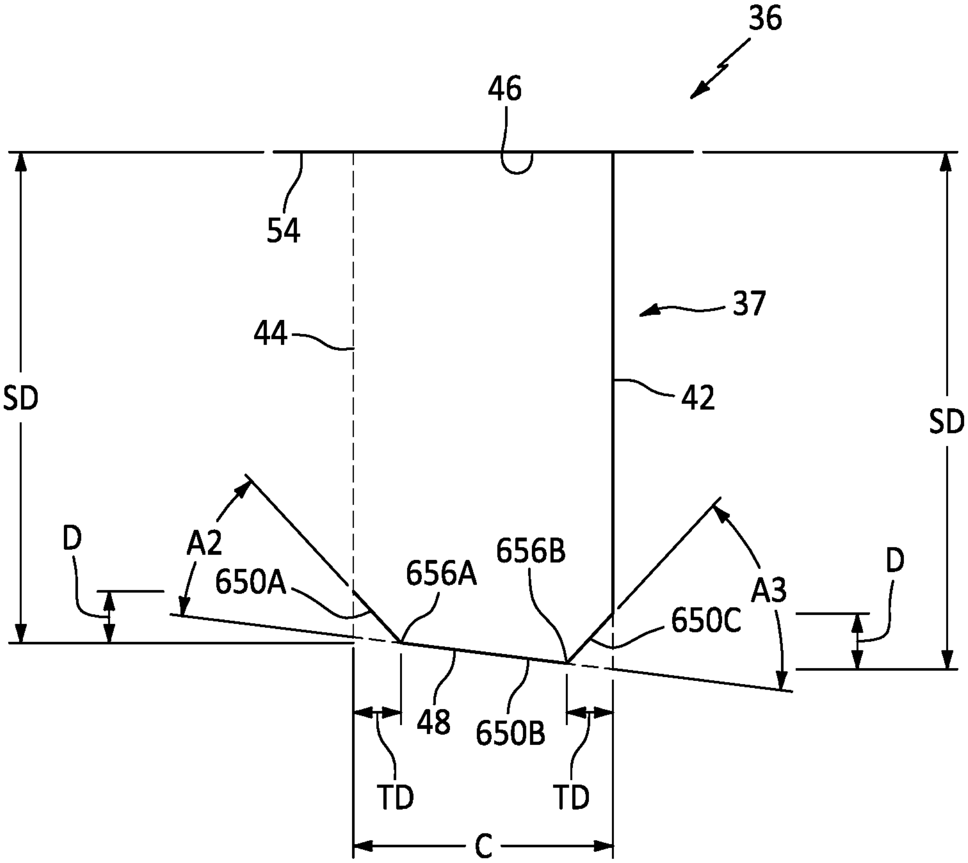
FIG. 6A is a stator vane like that shown in FIG. 6, providing positional information regarding the leading edge cutback and the trailing edge cutback.

Another example of a stator vane 36 having a vane tip surface 50 that does not extend along a continuous line is shown in FIGS. 6 and 6A. In this example, the stator vane 36 includes a vane tip surface 50 that includes a first portion 650A, a second portion 650B, and a third portion 650C, wherein the second vane tip surface portion 650B is disposed between the first and third vane tip surface portions 650A, 650C. The first, second and third vane tip surface portions 650A-C extend between the pressure side surface 40 and the suction side surface 38. The first vane tip surface portion 650A extends between the trailing edge 44 to a first interface 656A with the second vane tip surface portion 650B. The second vane tip surface portion 650B extends between the first interface 656A to a second interface 656B with the third vane tip surface portion 650C. The third vane tip surface portion 650C extends between the leading edge 42 to the second interface 656B. At each of the first and second interfaces 656A, 656B, the linearity or curvature of the vane tip surface portion changes; i.e., the linearity or curvature of the first vane tip surface portion 650A is different from that of the second vane tip portion 650B, and the linearity or curvature of the second vane tip surface portion 650B is different from that of the third vane tip portion 650C. In these embodiments, the first vane tip surface portion 650A may be disposed at an angle (A2) relative to the second vane tip surface portion 650B (e.g., giving the appearance that the trailing edge 44 corner of the vane airfoil 37 is removed—a "cutback"), and the third vane tip surface portion 650C may be disposed at an angle (A3) relative to the second vane tip surface portion 650B (e.g., giving the appearance that the leading edge 42 corner of the vane airfoil 37 is removed—a "cutback"). FIG. 6A uses dashed lines to illustrate how the second vane tip portion 650B would otherwise extend to the leading edge 42 and the trailing edge 44 if the vane tip surface 50 was continuous. FIGS. 6 and 6A diagrammatically illustrate the first, second, and third vane tip surface portions 650A-C as extending along respective straight lines. As stated above, however, a vane tip surface 50 may extend along a straight line or may extend along a curvilinear line. In some embodiments, the first, second and/or third vane tip portions 650A-C may extend along a straight line or a curvilinear line, including any combination thereof.

The first and third vane tip surface portion 650A, 650C may terminate at a position on the trailing edge 44/leading edge 42 similar to that described above with respect to the embodiment shown in FIGS. 4 and 4A; e.g., a distance of up to about ten percent (10%) of the spanwise distance of the airfoil 37. The first interface 656A between the first and second vane tip surface portions 650A, 650B and the second interface 656B between the second and third vane tip surface portions 650B, 650C may each be disposed at a position on the vane tip surface 50 similar to that described above with respect to the interface 56 between the first and second vane tip surface portions 50A, 50B in the embodiment shown in FIGS. 4 and 4A; e.g., a distance of up to about ten percent (10%) of the chord of the airfoil 37 at the vane tip 48.

The "cutbacks" created by the angled vane tip surfaces at the leading edge 42 and/or trailing edge 44 of the airfoil 37 shown in FIGS. 4-6A may in some applications change the incidence angle of the air incident to the stator vane airfoil 37 at the cutback; i.e., the air flow incidence angle at the angled vane tip surface at the leading edge 42 and/or at the trailing edge 44 of the airfoil 37 is understood to mitigate the forcing function (e.g., periodic forces) acting on the stator vane 36. As a result, the stator vane airfoil 37 is understood to be less susceptible to induced vibrational modes, resonant responses, and undesirable high cycle fatigue (HCF). It should be noted that because this is a stator vane 36 application, the stator vane 36 is cantilevered, and the stator vane tip is proximate the inner gas path structure, the forcing function is produced by chaotic airflow. A rotor blade that may expand radially as a result of centrifugal forces, and/or as a result of thermal growth and create interference with an outer gas path structure (e.g., a seal, etc.) is subject to a forcing function (e.g., frictional/mechanical load) that is different from that produced by chaotic air/gas acting on the stator vane airfoil 37.

In some embodiments, a stator vane 36 may include one or more aero passages 60 extending between the suction side surface 38 and the pressure side surface 40 proximate the vane tip. In some embodiments, the one or more aero passages 60 are disposed spanwise below the vane tip surface 50 and therefore do not intersect with the vane tip surface 50. In these embodiments, the vane tip surface 50 is unbroken by any aero passage 60 and the interface between the vane tip surface 50 and the inner gas path structure remains intact to minimize air passage through the interface.

Figure 7:
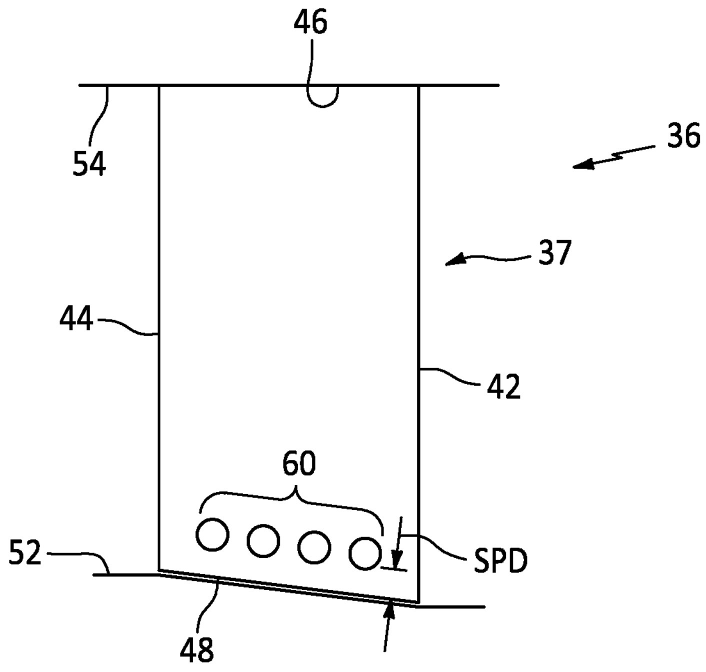
FIG. 7 is a diagrammatic planar view of a stator vane having a plurality of aero passages disposed in the airfoil.
Figure 8:
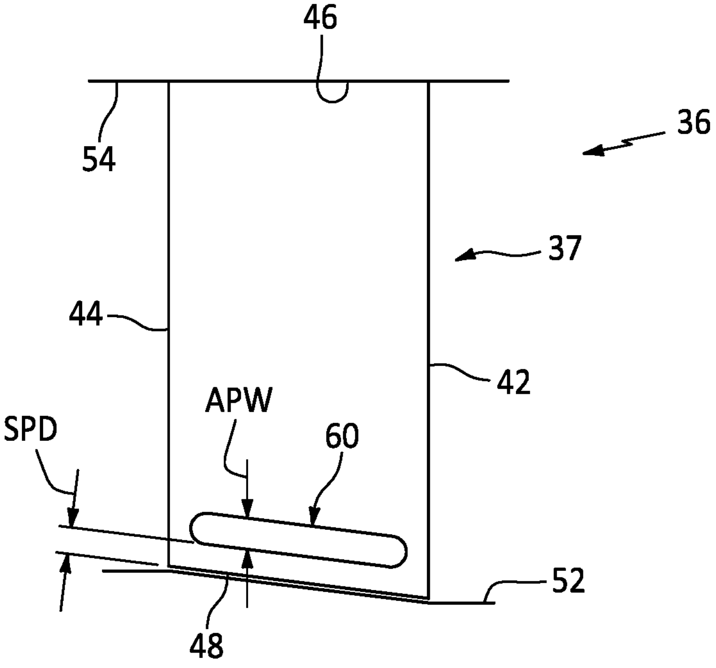
FIG. 8 is a diagrammatic planar view of a stator vane having an aero passage disposed in the airfoil.
Figure 11:
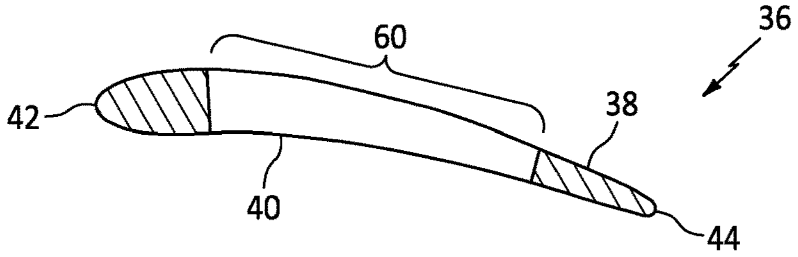
FIG. 11 is a diagrammatic sectional view of stator vane embodiment having an aero passage disposed in the airfoil.

The one or more aero passages 60 may assume a variety of different geometric configurations, each extending between the suction side surface 38 and the pressure side surface 40. FIGS. 7 and 8 illustrate non-limiting examples of present disclosure stator vanes 36 with different aero passage 60 configurations. In the embodiment shown in FIG. 7, the vane airfoil 37 includes four (4) aero passages 60 independent of one another. The aero passages 60 shown in FIG. 7 are circular shaped, but the aero passages 60 are not limited to any particular geometric configuration; e.g., aero passages 60 may be oval, oblong, etc. In the embodiment shown in FIG. 7, the independent aero passages 60 are spaced apart from one another in a chordwise direction across the airfoil 37 proximate the vane tip. The independent aero passages 60 shown in FIG. 7 are uniformly chordwise spaced apart from one another and substantially aligned with one another spanwise; e.g., each independent aero passage 60 is disposed approximately the same distance from the vane tip 48. In alternative embodiments, independent aero passages 60 may be non-uniformly distributed across the airfoil 37 proximate the vane tip 48; e.g., non-uniformly distributed chordwise, or non-uniformly distributed spanwise, or any combination thereof. The vane 36 embodiment shown in FIGS. 8 and 11 includes a single slot-like aero passage 60 having a chordwise extending length and a spanwise extending width proximate the vane tip 48. The slot is shown having a linear lengthwise configuration and a uniform spanwise width. The present disclosure is not limited to this configuration; e.g., the linear axis of the single slot-like aero passage 60 may be non-linear, or the spanwise width may vary, or any combination thereof.

Figure 9:
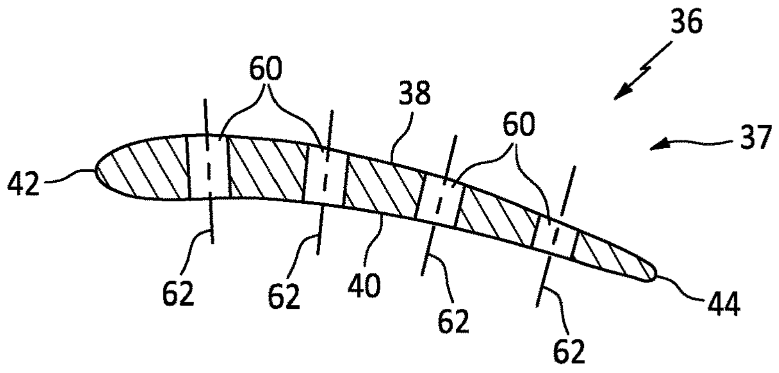
FIG. 9 is a diagrammatic sectional view of stator vane embodiment having a plurality of aero passages disposed in the airfoil, each with an axis substantially perpendicular to the suction and pressure side surfaces.
Figure 10:
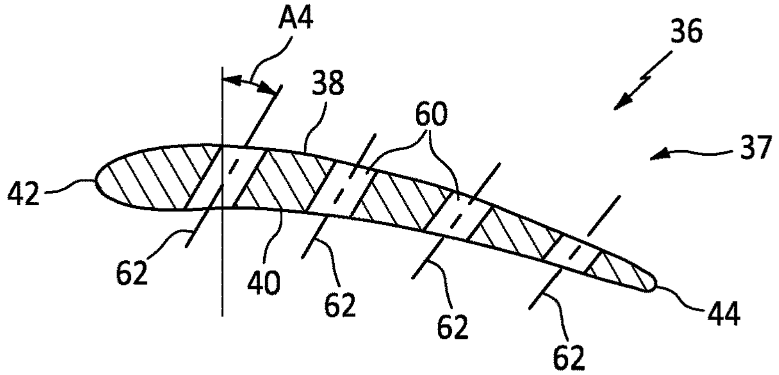
FIG. 10 is a diagrammatic sectional view of stator vane embodiment having a plurality of aero passages disposed in the airfoil, each with an axis canted at an angle relative to the suction and pressure side surfaces.

The axis of the aero passages 60 may assume a variety of different configurations. FIG. 9 is a sectional view that illustrates the aero passage 60 configuration shown in FIG. 7. In FIG. 9, the axis 62 of each aero passage 60 is substantially perpendicular to the suction side surface 38 and the pressure side surface 40. FIG. 10 is a sectional view of an aero passage 60 configuration similar to that shown in FIG. 7. In FIG. 10, the axis 62 of each aero passage 60 is disposed at a non-perpendicular angle (A4—i.e., canted) to the suction side surface 38 and the pressure side surface 40. In the embodiments shown in FIGS. 9 and 10, all of the aero passages 60 all disposed at similar angles. In alternative embodiments, the axes 62 of the plurality of aero passages 60 may be disposed at different angles relative to one another; e.g., in some embodiments one or more of the aero passages 60 may extend perpendicular to the suction side surface 38 and the pressure side surface 40, and one or more of the aero passages 60 may be canted.

Figure 12:
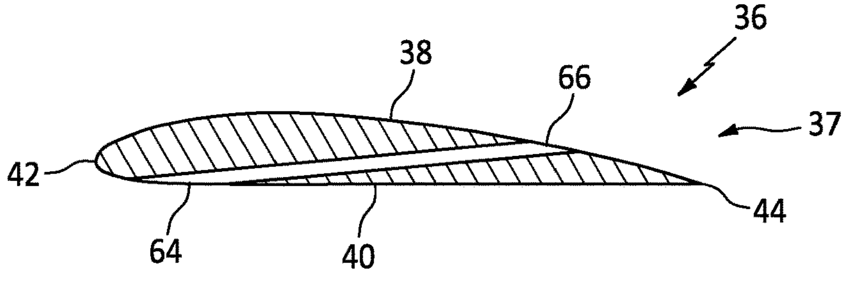
FIG. 12 is a diagrammatic sectional view of stator vane embodiment having an aero passage disposed in the airfoil.

In some embodiments, one or more aero passages 60 may include an inlet disposed in the pressure side surface 40 or the suction side surface 38 of the stator vane airfoil 37 proximate the leading edge 42 and an exit disposed on the opposite side of the stator vane airfoil 37 proximate the trailing edge 44. FIG. 12 illustrates an embodiment wherein one or more aero passages 60 may include an inlet 64 disposed in the pressure side surface 40 of the stator vane airfoil 37 proximate the leading edge 42 and an exit 66 disposed in the suction side surface 38 of the stator vane airfoil 37 proximate the trailing edge 44. In these embodiments, the aero passage inlet 64 may be disposed in the twenty percent (20%) of the chordwise length of the airfoil 37 contiguous with the leading edge 42, and the aero passage exit 66 may be disposed in the thirty percent (30%) of the chordwise length of the airfoil 37 contiguous with the trailing edge 44.

Each aero passage 60 has a flow area (i.e., the void area through which air/gas may flow from the pressure side surface 40 to the suction side surface 38 or vice versa) that is defined by the perimeter of that particular aero passage 60; e.g., the flow area may be defined as the planar area established by the aero passage 60 perimeter, which planar area is perpendicular to the flow direction through the aero passage 60. In those embodiments having a single aero passage 60, the total aero passage 60 flow area of that vane 36 equals the flow area of the single aero passage 60. In those embodiments having a plurality of aero passages 60, the total aero passage flow area of that vane equals the sum of the flow areas of each independent aero passage 60. The one or more aero passages 60 are configured to permit some amount of incident airflow to pass through the vane airfoil 37. The amount of incident airflow that passes through the vane airfoil 37 is a function of the total aero passage flow area of that vane 36. The airflow passing through the one or more aero passages 60 would otherwise be incident to the airfoil 37 and would participate in the forces applied to the airfoil 37 attributable to the airflow, including airflow that produces a periodic forcing function that, in turn, may give rise to undesirable vibrational modes as described above. The one or more aero passages 60, therefore, operate to decrease the forces acting in the region of the vane tip 48, including those forces that may be periodic. In those embodiments having a plurality of aero passages 60 (e.g., like the circular shaped aero passages 60 shown in FIG. 7), the aero passages 60 may have a diameter (or hydraulic diameter if non-circular) that may be about ten percent (10%) of the vane airfoil span (SD) and the single slot-like aero passage 60 shown in FIG. 8 may have a spanwise extending width (APW—see FIG. 8) that may be about ten percent (10%) of the vane airfoil 37 span.

The total aero passage flow area of a stator vane 36 may be chosen for a given application and therefore may vary between different stator vane 36 applications. It is understood that a total aero passage flow area that is in the range of between about twenty-five percent (25%) to about seventy-five percent (75%) of the total surface area of about the top twenty percent (20%) of the vane airfoil 37 surface will produce desirable results for most stator vane 36 applications. The total surface area of the pressure side surface 40 or the suction side surface 38 of the vane airfoil 37 is the area of the surface area defined by the vane tip 48, the radial base end 46, the leading edge 42, and the trailing edge 44. The about top twenty percent (20%) of the vane airfoil 37 surface area refers to the portion (i.e., 20%) of the total vane area (in the absence of aero passages 60) that is defined by the vane tip 48, the leading edge 42, and the trailing edge 44, extending from the vane tip 48 toward the radial base end 46 a distance. In some applications, the surface areas of the pressure side surface 40 and the suction side surface 38 may be unequal. The term "about" is used to modify the "top twenty percent (20%) of the vane airfoil surface area" to, for example, accommodate any such difference; e.g., the "about twenty percent (20%) of the vane airfoil surface area" may be slightly greater on one side of the vane and smaller on the other side of the vane.

The position of an aero passage 60 on the vane airfoil 37 may be defined in terms of a separation distance from the vane tip. In some embodiments, the edge of the aero passage 60 (or the edge of each respective aero passage 60) closest to the vane tip (i.e., the "tip most edge") may be disposed a separation distance ("SPD") from the vane tip 48 in the range of about five to ten percent (5-10%) of the span of the airfoil 37 at the respective aero passage 60. As indicated above, however, independent aero passages 60 may be non-uniformly distributed spanwise and their respective separation distances (SPD) may differ relative to one another, and the lengthwise/chordwise axis of a single slot-like aero passage 60 may be non-linear, varying spanwise.

Figure 13:
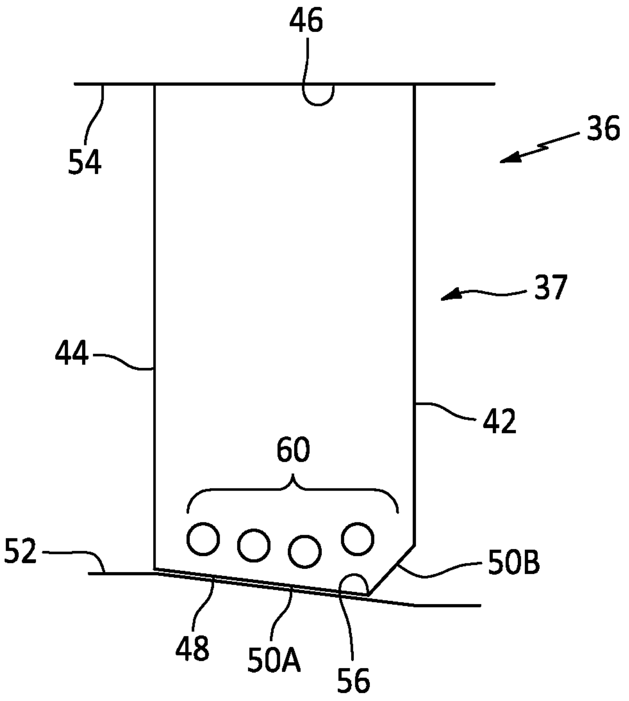
FIG. 13 is a planar view of a stator vane embodiment having a cut back and aero passages disposed in the airfoil.

FIG. 13 illustrates an example stator vane 36 that includes a cutback (e.g., disposed at the leading edge 42 of the stator vane 36) and a plurality of aero passages 60 disposed within the stator vane 36. The present disclosure includes any combination of the cutbacks and aero passages 60 described herein.

The present disclosure is described in terms of a stator vane 36 disposed within a compressor section. the present disclosure is not limited to compressor stator vanes 36 and present disclosure stator vanes 36 may be configured for use elsewhere in a gas turbine engine, such as within the turbine section.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A stator vane for a gas turbine stator vane stage, comprising: an airfoil having: a leading edge chordwise spaced apart from a trailing edge; a vane tip spanwise spaced apart from a radial base end; a suction side surface (SSS) extending chordwise between the leading edge and the trailing edge, and extending a spanwise length between the radial base end and the vane tip; a pressure side surface (PSS) extending chordwise between the leading edge and the trailing edge, and extending spanwise between the radial base end and the vane tip, wherein the SSS and the PSS are disposed on opposite sides of the airfoil; Anda plurality of aero passages, each of the plurality of aero passages extending through the airfoil between the SSS and the PSS along a respective aero passage axis, and each of the plurality of aero passages spanwise separated from the vane tip; wherein the stator vane is configured so when disposed within the stator vane stage, the airfoil is cantilevered with the vane tip being unsupported; wherein the plurality of aero passages are disposed in a top twenty percent of the vane airfoil, the top twenty percent of the vane airfoil contiguous with the vane tip, extending chordwise between the airfoil leading edge and the airfoil trailing edge, and extending spanwise from the vane tip towards the radial base end, wherein at least one respective aero passage axis is perpendicular to and not canted with respect to the SSS and the PSS;

wherein at least one respective aero passage axis is disposed at a non-perpendicular angle relative to a line perpendicular to the suction side surface and the pressure side surface.

2. The stator vane of claim 1, wherein the PSS has a total surface area (PSS surface area) defined by the leading edge, the trailing edge, the radial base end, and the vane tip, wherein the plurality of aero passages are disposed within a top twenty percent of the PSS surface area, wherein the top twenty percent of the PSS surface area is contiguous with the vane tip, extending chordwise between the airfoil leading edge and the airfoil trailing edge, and extending spanwise from the vane tip towards the radial base end.

3. The stator vane of claim 2, wherein the SSS has a total surface area (SSS surface area) defined by the leading edge, the trailing edge, the radial base end, and the vane tip, wherein the plurality of aero passages are disposed within a top twenty percent of the SSS surface area, wherein the top twenty percent of the SSS surface area is contiguous with the vane tip, extending chordwise between the airfoil leading edge and the airfoil trailing edge, and extending spanwise from the vane tip towards the radial base end.

4. The stator vane of claim 3, wherein each of the plurality of aero passages has a flow area and the sum of the respective aero passage flow areas is a collective flow area, and the collective flow area is in a range of twenty-five to seventy-five percent of the top twenty percent of the SSS surface area or the top twenty percent of the PSS surface area.

5. The stator vane of claim 4, wherein the airfoil has a chordwise extending width; and wherein each of the plurality of aero passages has a tip-most edge; and wherein the tip most edge of each said aero passage of the plurality of aero passages is separated from the vane tip by the distance in the range of five to ten percent of the spanwise length of the airfoil at the respective aero passage.

6. The stator vane of claim 5, wherein at least one said aero passage of the plurality of aero passages has a circular shape.

7. The stator vane of claim 1, wherein all the aero passages are disposed in a chordwise extending row.

8. The stator vane of claim 1, wherein each of the plurality of aero passages has a tip-most edge, and the tip most edge of each of the plurality of aero passages is separated from the vane tip by a distance in the range of five to ten percent of the spanwise length of the airfoil.

* * * * *